UNITED STATES PATENT OFFICE.

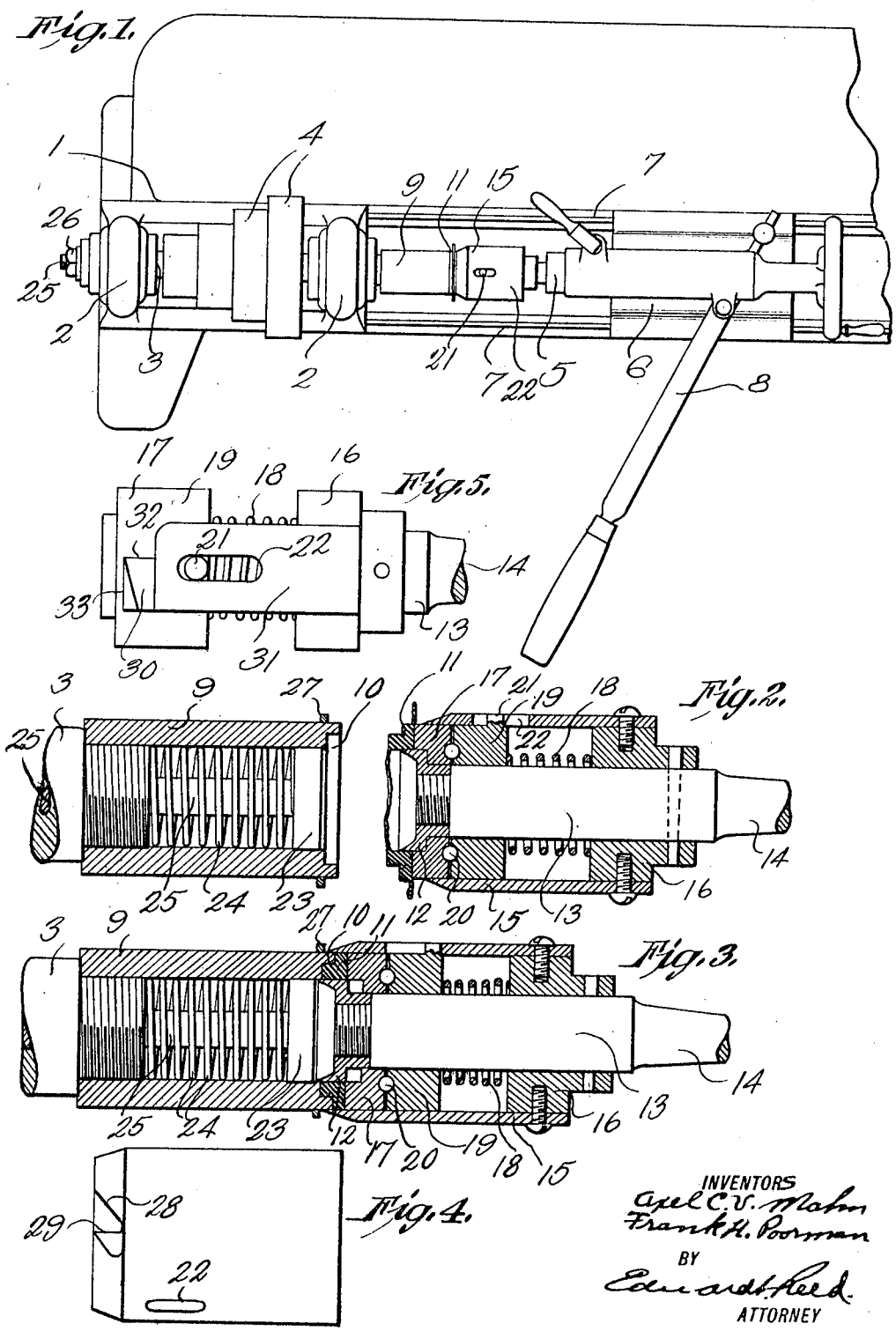

AXEL C. V. MALM AND FRANK H. POORMAN, OF DAYTON, OHIO, ASSIGNORS TO THE MALM MACHINE COMPANY, OF DAYTON, OHIO, A CORPORATION OF OHIO.

DEVICE FOR TRIMMING GASKETS AND THE LIKE.

1,270,038.  Specification of Letters Patent.  Patented June 18, 1918.

Application filed August 8, 1917. Serial No. 185,111.

*To all whom it may concern:*

Be it known that we, AXEL C. V. MALM and FRANK H. POORMAN, citizens of the United States, residing at Dayton, in the county of Montgomery and State of Ohio, have invented certain new and useful Improvements in Devices for Trimming Gaskets and the like, of which the following is a specification, reference being had therein to the accompanying drawing.

This invention relates to devices for trimming gaskets and the like.

Gaskets and other articles which are molded from soft rubber, or similar materials, usually come from the molds with a fin or thin web of material projecting from one or more edges thereof. Before the article can be used or marketed these fins must be removed or trimmed off in such a manner as to leave a smooth edge. Heretofore the articles have been trimmed by hand and the work has been slow and expensive.

The object of the present invention is to provide a power operated device which will operate rapidly and efficiently to remove these fins from, or trim, gaskets and the like; and further to provide such a machine which will be very simple both in construction and operation, thus not only enabling the machine to be produced at a low initial cost and to be easily maintained in operative condition, but also enabling it to be operated by unskilled labor.

Other objects of the invention will appear as the mechanism is described in detail.

In the accompanying drawings Figure 1 is a plan view of a machine embodying our invention, with the frame partly broken away; Fig. 2 is a sectional view taken centrally of the trimming members, showing these members separated; Fig. 3 is a similar view showing these members in their cutting positions; Fig. 4 is a detail view of the tubular cutter; and Fig. 5 is a plan view on a slightly smaller scale of one of the trimming members, showing a modified form of exterior cutter.

In these drawings we have illustrated one embodiment of our invention, with a slight modification thereof, and have shown the same as designed for trimming gaskets of soft rubber which come from the molds with an inwardly extending fin at the small end thereof and an outwardly extending fin at the larger end thereof, but it will be understood that the invention is not limited to the trimming of gaskets of this kind, or to the trimming of articles made from soft rubber, as the mechanism can be readily adapted to operate on articles of various kinds manufactured from materials of different kinds.

In that form of the invention here illustrated the trimming devices are mounted on a frame 1 which may be of any suitable character, and which is provided with bearings 2 in which is mounted a shaft 3 having secured thereto a suitable driving member which is here shown as a stepped belt pulley 4, but it will be understood that this shaft may be motor driven or that power may be applied thereto in any suitable manner. A chuck 5 is mounted on the frame 1 in substantial alinement with the axis of the shaft 3 and is arranged to be moved axially toward and from that shaft. In the present instance the chuck is mounted on a carriage 6 which is slidably mounted on guides or tracks 7 carried by the frame 1. The chuck is provided with suitable devices for gripping the shank of a tool and for moving the chuck along the track 7. This latter movement is, in the present instance, accomplished by means of a lever 8 connected with the carriage 6 and with the carriage frame and projecting forwardly into a position where it may be readily grasped by the operator.

The trimming device proper comprises two coöperating members, one of which is mounted on the shaft 3 so as to be rotated therewith, and the other of which is mounted in the chuck 5 so that it is held against rotation but may be moved both into and out of coöperating relation with the first-mentioned member. One of these members carries a cutter or cutters. In the present instance there are two cutters to remove the inner and outer fins, and the other member is provided with parts to engage the gasket during the cutting operation and to serve as a cutter block against which the cutter is operated. In the present construction the last-mentioned member, or cutter block, is rotated and the cutters are held against rotation. The gasket is so supported with relation to the cutters that when it is engaged by the coöperating member or cutter block it will be rotated during the cutting operation, The particular construction of the device as a whole may vary greatly from that here illustrated without departing from the spirit of the invention, but in the present drawings we have shown the rotating member or cutter block in the form of a sleeve 9, which is screw-threaded on to the end of the rotating shaft, or spindle, 3, and is provided at its outer end, that is, the end adjacent to the cutting member with an annular recess or interior rabbet 10. This recess is of such a size that the smaller portion of the gasket, which is shown at 11 in Figs. 2 and 3, will fit snugly within the same, the inner shoulder of the recess being of a width equal to the thickness of the inner portion of the gasket. The outer shoulder of the recess, which is the extreme end portion of the sleeve, is of a thickness corresponding to the width of the shoulder at the larger end of the gasket. Consequently when the gasket is in engagement with the member 9, or cutter block, the inner and outer surfaces of the gasket will lie flush with the inner and outer surfaces of the cutter block. The cutting member may take various forms and the cutters may be of different constructions, but as illustrated in Figs. 2 and 3 we have shown the inner cutter, that is the cutter which removes the fin at the inner edge of the gasket, as a circular cutter, as shown at 12, which is of such a diameter that it will fit snugly within the gasket and when the gasket engages the inner shoulder of the recess 10 of the cutter block will move across the edge of the cutter block and shear the fin from the edge of the gasket. This cutter 12 is shown as rigidly secured to the edge of a spindle 13 having a shank portion 14 adapted to enter and to be rigidly held by the chuck 5. The second, or outer cutter is also carried by the spindle 5 and is rigidly secured thereto. This cutter is so mounted that when the shoulder of the gasket is brought into engagement with the end of the cutter block the outer cutter will be moved across the edge of the cutter block and will shear the fin from the outer edge of the gasket. As shown in Figs. 2 and 3 this outer cutter is also circular in form and comprises a sleeve 15 which is rigidly secured to a collar 16 which in turn is rigidly secured to the spindle 13. Mounted on the hub of the inner cutter 12 is a yieldable and rotatable collar 17, which will engage the adjacent face of the gasket and press the same against the cutter block while the cutters are advanced into cutting engagement with the fins. The diameter of the hub of the cutter 12 is the same as the diameter of the spindle 13 so that the yieldable collar 17 can slide freely from the hub to the spindle and vice versa. A spring 18 acts on the yieldable collar to hold the same firmly in engagement with the gasket. To permit of the free rotation of the collar 17 a second collar 19 is slidably mounted on the spindle 13 and is interposed between the spring 18 and the yieldable collar 17 and antifriction balls 20 are interposed between the collars. The collar 19 is held against rotation but is permitted to slide on the spindle 13 by means of a pin 21 which enters an elongated slot 22 in the outer cutter 15. When in their normal or idle positions the two parts of the trimming device are separated much more widely than shown in Fig. 2, thus giving the operator ample opportunity to remove the trimmed gasket and place in position an untrimmed gasket. With the parts in this position an untrimmed gasket is slipped onto the end of the inner cutter 12 which projects beyond the forward edge of the yieldable collar and which serves to support the gasket. The lever is then operated to move the cutting member bodily toward the revolving member or cutter block 9. The small end of the gasket will enter the annular recess 10 in the cutter block and when the gasket comes in contact with the cutter block its movement will be checked, but the two cutters will continue to move, due to the yieldability of the collar 17, until they are brought into engagement with the fins on the adjacent edges of the gasket. As soon as the rotating member 9 contacts with the gasket it will impart rotatory movement thereto, the rotatability of the yieldable collar permitting the gasket to have free rotation with the member 9. Consequently the gasket is rotating at a fairly high rate of speed when it is engaged by the cutters and a clean smooth cut is made. As the cutting member is withdrawn the gasket will usually be withdrawn with the same and can be readily removed from the inner cutter which supports the same. Inasmuch as this cutter is stationary, that is, has no rotatory movement, there is no danger of injury to the operator in removing the trimmed gasket or placing another gasket in position. A suitable ejector is provided to remove the separated inner fins from the hollow member 9. This is accomplished in the present instance by mounting a slidable disk or piston 23 within the hollow member 9, and providing a spring 24 to act upon the same and hold it normally near the operative end of the member 9. As here shown the ejector disk 23 is carried by a shaft 25 which extends through the shaft 3, which is hollow, and is provided at its outer end with a nut 26, which serves to limit the movement of the disk under the action of the spring and which may be adjusted to regulate this movement. Inasmuch as a part at least of the outer fins will be removed in the form of rings and might accumulate upon the cutter block, we may if desirable provide the cutter block with an ejector. This ejector may be of any suitable character, but a fixed ring 27 secured to the outer surface of the sleeve 9 near the operative edge thereof will serve to cause the rings to be discharged therefrom. This ejector is placed just far enough from the edge of the sleeve so that it will not be engaged by the outer cutter. This leaves but a narrow space between the same and the edge of the sleeve and the high rate of speed at which the sleeve is operated will cause the ring-like fins to be thrown or to work their way from the end of the sleeve.

In certain classes of work it is found that a smoother cut is had by providing the cutter with two cutting edges, one parallel with the axis of rotation and the other transverse to that axis. In the case of the circular or sleeve cutter shown in Figs. 2, 3 and 4 the second cutting edge is provided by forming a notch 28 in the edge of the cutter, having one edge extending parallel with the axis of rotation of the gasket, as shown at 29, and sharpening this edge. In Fig. 5 we have shown a straight blade cutter instead of a circular cutter. This blade is shown at 30 and is carried by a bar 31 which is secured to the spindle 13 through the medium of the fixed collar 16 and is slidably connected with the collar 19 in the same manner as is the circular cutter shown in Figs. 2 and 3. The blade 30 is here shown as having two cutting edges, one of which, the edge 32, extends parallel with the axis of rotation of the work and the other of which, the edge 23, extends transversely to that axis. Consequently as the blade moves into engagement with the work a cutting edge will operate both on the forward movement of the cutter and upon the rotatory movement of the work, thereby avoiding any tearing of the rubber and giving a very smooth cut.

The operation of the device will be readily understood from the foregoing description, and it will be apparent that the only action necessary on the part of the operator is to place an untrimmed gasket, or other article, on the stationary inner cutter 12, actuate the lever 8 to bring the two trimming members into coöperative relation and then separate them and to remove the trimmed gasket from said inner cutter. Because of the rotation of the gasket during the cutting operation the cut is very smooth and uniform, particularly is this true when the circular knives are employed. The device is of a very simple character and the parts can be readily separated to enable the cutters to be sharpened or to permit repairs or adjustments to be made.

While we have shown and described one embodiment of our invention we wish it to be understood that we do not desire to be limited to the details of construction as various modifications will occur to a person skilled in the art.

Having now fully described our invention, what we claim as new and desire to secure by Letters Patent, is:—

1. In a device of the character described, a cutter block, means for rotating the same, a cutter arranged to cut in a circular path described about the axis of said cutter block, and means for imparting axial movement to said cutter to bring the same into coöperative relation with said cutter block.

2. In a device of the character described, a cutter block, means for rotating the same, a nonrotatable cutter arranged in longitudinal alinement with said block and having a cutting edge arranged to cut in a circular path described about the axis of said cutter block, and means for moving said cutter toward and from said cutter block.

3. In a device of the character described, a cutter block, means for rotating the same, a nonrotatable cutter arranged in longitudinal alinement with said cutter block and having a cutting edge arranged to cut in a circular path described about the axis of said cutter block, means for moving one of said members toward and from the other, and means for supporting the work in a position to be acted upon by said cutter when the latter is moved into operative relation with said cutter block.

4. In a device of the character described, coöperating trimming members, means for rotating one of said members, means for imparting axial movement to one of said members to bring the two members into coöperative relation, one of said members having means for so supporting the article to be trimmed that rotatory movement will be imparted thereto by said rotatable member.

5. In a device of the character described, coöperating trimming members, means for rotating one of said members, means for imparting axial movement to one of said members to bring the two members into coöperating relation, said last-mentioned member having means for so supporting the article to be trimmed that rotatory movement will be imparted thereto by said rotatable member when the two members are brought into coöperative relation.

6. In a device of the character described, coöperating trimming members, means for rotating one of said members, means for imparting axial movement to the other of said members to bring the two members into coöperating relation, said axially movable member comprising a cutter, said axially movable member also having means to support the article to be trimmed in operative relation to said cutter and to permit said article to be rotated when the two members are brought into operative relation.

7. In a device of the character described, coöperating trimming members, means for rotating one of said members, means for imparting axial movement to the other of said members to bring the two members into coöperating relation, said axially movable member comprising a circular cutter adapted to have an article to be trimmed placed about the same, said axially movable member also having means to retain said article in a position to be operated upon and to permit the same to be rotated when it is brought into contact with said rotatable member.

8. In a device of the character described, a rotatable member, a cutter mounted for movement toward and from said rotatable member, a yielding member mounted for movement with said cutter toward and from said rotatable member and adapted to retain the article to be acted upon in proper relation thereto, and to permit said article to be rotated and said cutter to have axial movement relatively thereto when the cutter is moved into coöperative relation with the first-mentioned rotatable member.

9. In a device of the character described, a rotatable member having an end portion to form a cutter block, a spindle, a cutter carried by said spindle and adapted to be moved into and out of coöperative relation with said cutter block, and a rotatable device yieldably mounted on said spindle to hold the article to be trimmed in engagement with said cutter block, to permit the same to rotate therewith and to permit the cutter to move forward relatively thereto.

10. In a device of the character described, a rotatable member having a hollow end portion forming a cutter block, a spindle, a circular cutter mounted on said spindle and adapted to enter the hollow end portion of said cutter block, means for moving said spindle and said cutter toward and away from said cutter block, a collar rotatably and yieldably mounted in the rear of said cutter and arranged to engage an article mounted on said cutter.

11. In a device of the character described, coöperating trimming members, one of said members having inner and outer cutters and the other of said members having a part constituting a cutter block coöperating with said cutters, means for rotating one of said members and means for imparting axial movement to one of said members to bring the two members into coöperative relation.

12. In a device of the character described, coöperating trimming members, one of said members having inner and outer cutters and the other of said members having a part constituting a cutter block coöperating with said cutters, means for rotating one of said members and means for imparting axial movement to the other of said members.

13. In a device of the character described, coöperating trimming members, one of said members being rotatable and having an end portion forming a cutter block, the other of said members being capable of axial movement toward and from the first-mentioned member and having inner and outer circular cutters to coöperate with the respective portions of said cutter block, and means for imparting operative movement to the two members.

14. In a device of the character described, coöperating trimming members, one of said members being rotatable and having an end portion forming a cutter block, the other of said members being capable of axial movement toward and from the first-mentioned member and having inner and outer circular cutters to coöperate with the respective portions of said cutter block, said last-mentioned member also comprising a yieldable part to engage the article to be trimmed and hold the same in engagement with said cutter block, said yieldable part being of such a character as to permit said article to rotate with said rotatable cutter block.

15. In a device of the character described, a cylindrical member having an end portion adapted to form a cutter block, means for rotating said member, a second member having inner and outer cutters adapted to coöperate with the respective cutters of said cutter block, and having means for rotatably supporting an article in operative relation to said cutters and said cutter block.

16. In a device of the character described, a member having a cutter and means to support an article in an operative position with relation to said cutter, a second member, means for rotating the same, and means to cause said article and said second member to be brought into engagement one with the other, whereby said article will be rotated.

17. In a device of the character described, a member having a cutter and means to support an article in operative position with relation to said cutter, and a second member arranged in axial alinement with the first mentioned member, means for rotating said second member, and means to impart axial movement to one of said members to cause said article and said second member to be brought into engagement one with the other whereby said article will be rotated.

18. In a device of the character described, a spindle mounted for axial movement, a cutter carried by said spindle, a collar yieldably and rotatably mounted on said spindle in the rear of said cutter, a second cutter rigidly secured to said spindle and having its cutting edge arranged adjacent to the periphery of said collar, a second member having parts to coöperate with said cutters and to rotate said second member.

19. In a device of the character described, a nonrotatable spindle mounted for axial movement, a circular cutter rigidly secured to one end of said spindle, a second circular cutter rigidly secured to said spindle and arranged concentrically of said first-mentioned cutter, a collar slidably and rotatably mounted in the rear of said first-mentioned cutter and having a portion arranged between the two cutters and adapted to engage an article extending about said first-mentioned cutter, a second member arranged in axial alinement with said spindle and having parts adapted to engage said article when axial movement is imparted to said spindle, and means for rotating said last-mentioned member.

20. In a device of the character described, a nonrotatable spindle, mounted for axial movement, a circular cutter rigidly secured to one end of said spindle, a collar rotatably and slidably mounted on said spindle in the rear of said cutter, a spring acting on said cutter to hold the same normally in its forward position, a collar rigidly secured to said spindle near the rear end thereof, a circular cutter having a sleeve-like portion extending about said collars and rigidly secured to said last-mentioned collar, a rotatable member arranged in axial alinement with said spindle and having parts adapted to coöperate with said cutters.

21. In a device of the character described, a rotatable member having a hollow end portion adapted to form a cutter block, a second member mounted for axial movement toward and from said rotatable member and having a circular cutter arranged in axial alinement with said cutter block, and a yieldable ejector mounted in the hollow end portion of said rotatable member to permit the cuttings to enter the same during the cutting operation and to then eject the cuttings therefrom.

22. In a device of the character described, coöperating trimming members, one of said members being rotatable and having an end portion forming a cutter block, the other of said members being capable of axial movement toward and from said first-mentioned part, and having a cutter provided with two cutting edges, one of said edges being arranged substantially parallel with the axis of rotation of the first-mentioned member, and the other of said edges extending transversely of said axis, and means for imparting operative movement to the two members.

23. In a device of the character described, coöperating trimming members, means for rotating one of said members, means for so supporting the article to be trimmed on the other of said members as to permit said article to be rotated when engaged by the first-mentioned member, a cutter carried by said other member and having two cutting edges, one arranged substantially parallel with the axis of rotation of said article, and the other extending transversely of said axis, and means for moving said cutter lengthwise of said axis.

24. In a device of the character described, trimming members, one of said members being rotatable and having a part adapted to engage the article to be trimmed during the trimming operation, an inner cutter carried by the other of said members adapted to support the work, an outer cutter carried by said other member and having two cutting edges, one of said edges extending substantially parallel with the axis of the first-mentioned member, and the other of said edges extending transversely of said axis, and means for moving said cutters lengthwise of the axis of rotation of the first-mentioned member after said first-mentioned member has been brought into engagement with the article to be trimmed.

25. In a device of the character described, means for supporting and rotating the article to be trimmed, and a cutter mounted for movement lengthwise of the axis of rotation of said article and having two cutting edges, one extending substantially parallel to said axis and the other extending transversely of said axis.

In testimony whereof, we affix our signatures hereto.

AXEL C. V. MALM.
FRANK H. POORMAN.

Copies of this patent may be obtained for five cents each, by addressing the "Commissioner of Patents, Washington, D. C."